Oct. 28, 1958    R. B. IMMEL    2,858,487
DUST-TIGHT D. C. SOLENOID ASSEMBLIES
Filed Dec. 20, 1954    3 Sheets-Sheet 1

WITNESSES:
E. A. McCloskey
Paul O. Harled

INVENTOR
Ralph B. Immel.
BY
Paul E. Friedemann
ATTORNEY

Oct. 28, 1958

R. B. IMMEL 2,858,487

DUST-TIGHT D. C. SOLENOID ASSEMBLIES

Filed Dec. 20, 1954

Oct. 28, 1958   R. B. IMMEL   2,858,487
DUST-TIGHT D. C. SOLENOID ASSEMBLIES
Filed Dec. 20, 1954   3 Sheets-Sheet 3
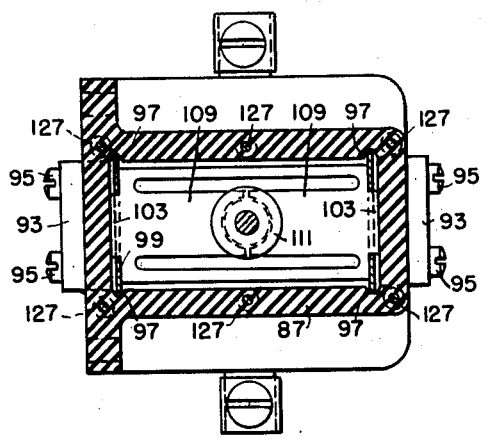
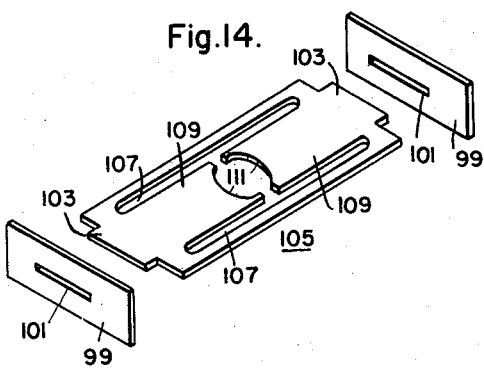
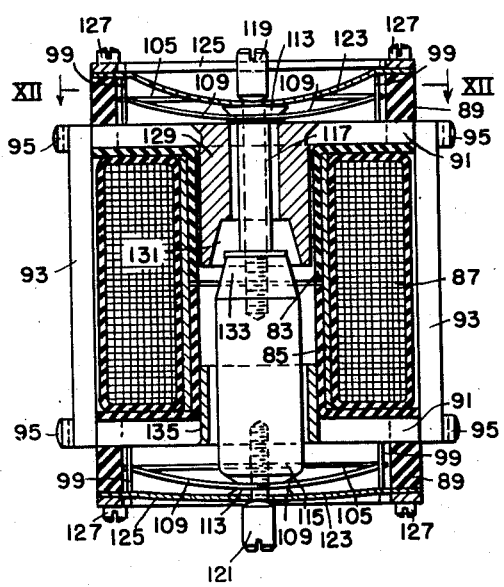
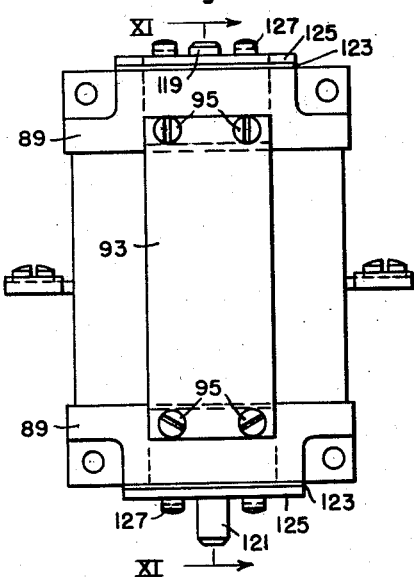

United States Patent Office
2,858,487
Patented Oct. 28, 1958

2,858,487

DUST-TIGHT D. C. SOLENOID ASSEMBLIES

Ralph B. Immel, Williamsville, N. Y., assignor to Westinghouse Electric Corporation, East Pittsburgh, Pa., a corporation of Pennsylvania Application December 20, 1954, Serial No. 476,315

4 Claims. (Cl. 317—191)

This invention relates to electromagnets and more particularly to dustproof solenoids.

An object of the invention is to provide a solenoid having means for excluding foreign material from the interior of the solenoid.

Another object of the invention is to provide a solenoid embodying flexible means at each end thereof for sealing the solenoid against the entrance of dust in which the flexible means serves to support and guide the moving armature.

Another object of the invention is to provide a solenoid embodying flexible dust caps at each end, which dust caps act as guide means for centering and guiding the moving armature.

Another object of the invention is to provide a solenoid embodying a flexible dust cap at each end thereof for sealing the solenoid against dust and having a thin metallic guide spring for guiding the movement of the solenoid armature.

The invention, both as to structure and operation, together with additional objects and advantages thereof, will be best understood from the following detailed description of several embodiments thereof when read in conjunction with the accompanying drawings.

In said drawings:

Fig. 12 is a sectional view taken substantially on line XII—XII of Fig. 13 looking in the direction indicated by the arrows;

Fig. 13 is a vertical sectional view taken on line XIII—XIII of Fig. 15 showing a further modification of the invention;

Fig. 14 is a perspective view showing the spring support and guide means for the solenoid shown in Fig. 13; and Fig. 15 is an end elevational view of the solenoid shown in Fig. 13.

Figure 1:
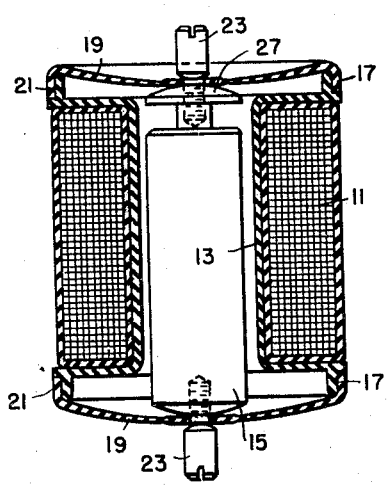
Figure 1 is a vertical sectional view of a solenoid embodying the principles of the invention.
Figure 2:
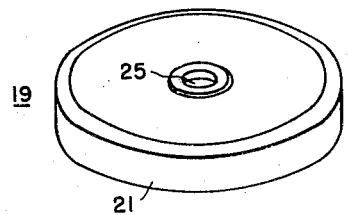
Fig. 2 is a perspective view of one of the dust caps for use with the solenoid shown in Fig. 1.

Referring to Fig. 1 of the drawings, the solenoid comprises an energizing coil 11 supported on a spool 13 of molded insulating material and a moving armature 15 disposed in the bore of the spool 13. Molded integral with each end of the spool 13 is an annular flange 17 on which is mounted a molded flexible cap 19. The cap 19 is provided with a flange 21 that is thicker than the main body thereof which tapers in thickness toward the center. The flanges 21 of the caps 19 fit tightly around the center periphery of the flanges 17 to seal the solenoid against the entry of dust particles.

The armature 15 is attached to the upper and lower dust caps 19 by means of screws 23 which extend through central openings 25 in the caps and threadedly engage the ends of the armature. The area immediately surrounding the opening 25 in the caps 19 is somewhat thicker than the disc portions of the caps. The heads of the screws 23 are larger than the openings 25 in the caps and the inner ends of the heads are rounded to provide a good dust-tight seal. The upper end of the armature is provided with a washer 27 of a non-magnetic material which is spaced from the end of the armature and rounded on its upper side adjacent the upper cap 19. The lower end of the armature 15 is similarly rounded adjacent the lower cap 19.

When the screws 23 are tightened, their rounded inner ends engage the edges of the caps 19 around the openings 25 therein and respectively compress the upper and lower caps 19 against the rounded surface of the washer 27 and the rounded lower end of the armature 15 and in this manner form good dust-tight seals around the openings 25 in the caps 19.

When the coil 11 is energized the armature 15 is moved upwardly into the coil guided by the flexible caps 19. During its movement the armature 15 is maintained substantially in the center of the space 13, thus reducing friction to a minimum. By employing the thin portions in the body of the caps 19 and relatively thick portions at the flange 21 and about the center opening 25 in the cap, flexibility and rigidity are provided in the caps at the desired points.

Figure 3:
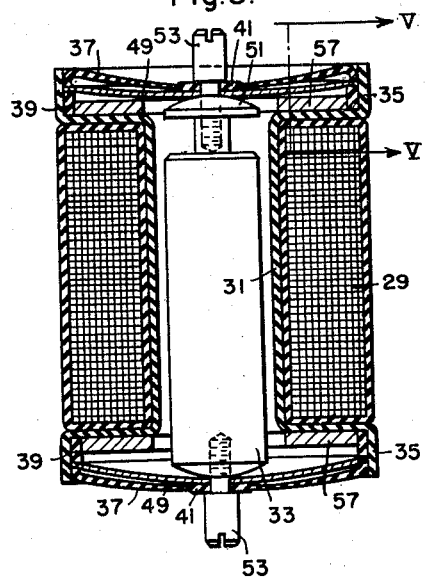
Fig. 3 is a vertical sectional view of a solenoid showing a modification of the dust cap and guiding means.
Figure 4:
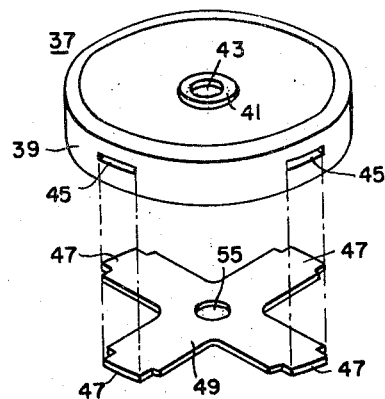
Fig. 4 is a perspective view of one of the dust caps and guide spring used on the solenoid shown in Fig. 3.
Figure 5:
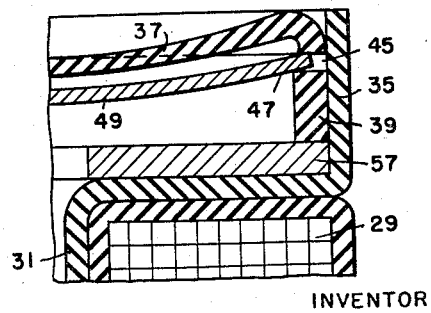
Fig. 5 is an enlarged fragmentary sectional view taken on line V—V of Fig. 3 showing a portion of the solenoid shown in Fig. 3.
Figure 6:
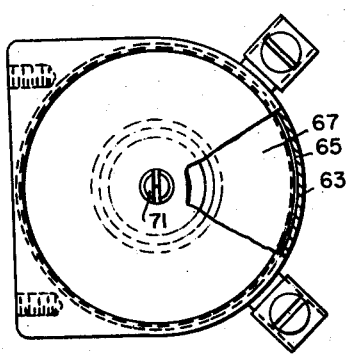
Fig. 6 is a top view partly in section of the solenoid shown in Fig. 7.

Fig. 3 illustrates a modification of the invention which utilizes, in addition to the flexible dust cap, a thin metallic guide spring. As shown in Fig. 3, the solenoid comprises an energizing coil 29 supported on a spool 31 of molded insulating material and a movable armature 33 disposed axially in the bore of the spool. The spool 31 is provided with annular flanges 35, one at each end thereof for receiving and supporting flexible dust caps 37. In the Fig. 3 modification the caps 37 are provided with relatively thick flanges 39 which are inserted with a tight fit inside the flanges 35 of the spool 31. The caps 37 taper in thickness inwardly from the flanges 39 toward their centers where they are provided with a relatively thick annular portion 41 surrounding holes 43. The flange 39 is also provided with four radial openings 45 for receiving the ends 47 of a thin cruciform guide spring 49. The ends 47 of the arms of the spring 49 are inserted in the openings 45 of the cap 37 as shown in Figs. 3 and 5, after which the assembly is pressed into the end of the spool inside the flange 39. At its upper end the armature 33 is provided with a washer 51 of a non-magnetic material spaced from the upper end of the armature 33. The armature 33 is attached to the upper cap 37 and the uper guide spring 49 by means of a screw 53 which passes through the opening 43 (Fig. 4) in the cap 37, through a central opening 55 in the spring guide and threadedly engages in a tapped opening in the reduced upper end of the armature 33. Tightening the screw 53 compresses the portion 41 of the cap 37 between the inner end of the head of the screw and the spring guide 49 which, together with the press fit of the flange 39 of the cap with the inner wall of the flange 35 of the spool 31, forms an effective seal. The lower dust cap 37 and the lower spring guide 49 are attached to the rounded lower end of the armature 33 in the same manner to seal the lower end of the solenoid against dust and to centrally support and guide the armature in its reciprocal movement. Washers 57 of magnetic material may be assembled at the ends of the spool 31 to form part of the magnetic circuit of the solenoid.

When the coil 29 is energized the armature 33 moves upwardly, causing the thin guide springs 49 and the dust caps 37 to flex upwardly. During this action the guide spring moves on the knife-edge-like bearings formed by the openings 45 in the flange 39 of the cap 37. When the coil 29 is deenergized the weight of the armature 33 restores it to the position shown in Fig. 3.

Figs. 6 to 9 inclusive illustrate another modification of the invention in which the dust caps and spring guides are mounted in inner annular grooves on the inside of end flanges of the coil spool.

Figure 7:
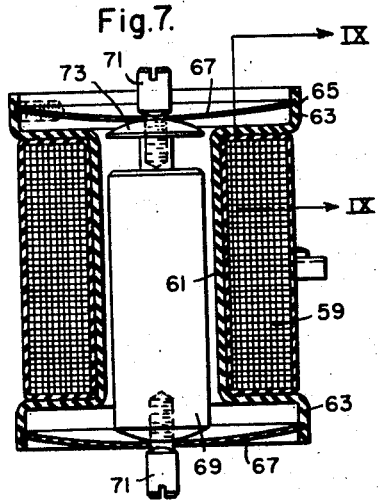
Fig. 7 is a vertical sectional view of another modification of the invention.
Figure 10:
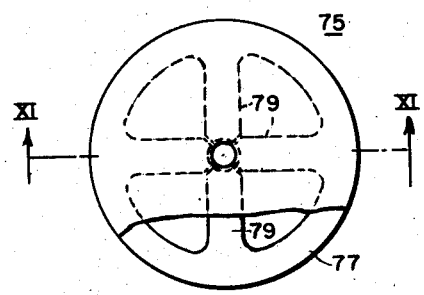
Fig. 10 is a plan view showing a modified sealing and guide disc for use in the solenoid shown in Fig. 7.
Figure 9:
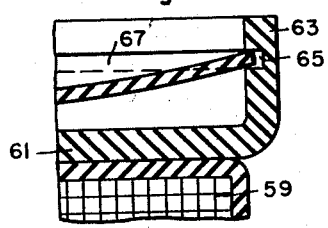
Fig. 9 is a sectional view of a portion of the solenoid shown in Fig. 7 showing the mounting for the sealing and guide disc.
Figure 11:
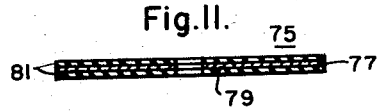
Fig. 11 is a sectional view of the sealing and guide disc shown in Fig. 10.

Referring to Fig. 7, an energizing coil 59 is mounted on a spool 61 of molded insulating material having a flange 63 molded at each end thereof. Molded in the inner surfaces of the flanges 63 are annular grooves 65 for receiving and supporting flexible diaphragms 67 which are made of thin flexible metal, plastic or may be of laminated construction having a thin metal central diaphragm with plastic or rubber discs on each side thereof as shown in Figs. 10 and 11. The diaphragms 67 are inserted by pressing inwardly on the center thereof, which slightly deforms the diaphragms, and forcing them inwardly until the edges of the diaphragms snap into the annular grooves 65.

An armature 69 similar to the armature shown in Figs. 1 and 3 is mounted in the central opening in the spool and supported on the diaphragms 67. The armature 69 is attached at its ends to the diaphragms 67 by means of screws 71 which pass through central openings in the diaphragms and threadedly engage in tapped holes in the ends of the armature. When tightened the rounded inner end of the head of the upper screw 71 presses the edge of the diaphragm surrounding the central opening against the rounded upper side of a non-magnetic washer 73 mounted on but spaced from the upper end of the armature 69. Similarly, tightening the lower screw 71 forms a pressure seal between the rounded lower end of the armature 69, the rounded inner end of the lower screw 71 and the diaphragm 67. This, together with the engagement of the outer edges of the diaphragms with the knife-edge bearings formed by the grooves 65, forms a dust-tight seal.

The outside diameter of the diaphragms 67 is slightly less than the inside diameter of the groove 65. When the coil 59 is energized the armature 69 moves upwardly, flexing the diaphragms 67 to the position shown in Fig. 8, and, upon deenergization of the coil 59, the armature drops by its own weight back to the position shown in Fig. 7.

Figure 8:
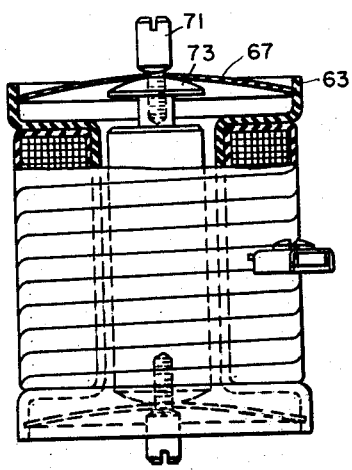
Fig. 8 is an elevational view partly in section of the solenoid shown in Fig. 7 and showing the solenoid in the energized position.

Figs. 10 and 11 illustrate a different form of diaphragm, indicated generally at 75, for use in the solenoid shown in Figs. 7 and 8. The laminated diaphragm 75 comprises a thin metal spring 77 in the shape of a ring having a plurality of inwardly extending fingers 79, the inner ends of which form an opening slightly larger than the diameter of the screws 71. Cemented or otherwise suitably and securely bonded to the opposite faces of the spring 77 are discs 81 of rubber or plastic material. The diaphragm 75 (Figs. 10 and 11) snaps into position in the groove 65 in the same manner as the diaphragm 67 and plastic or rubber discs form a good dust-tight seal with the knife-edge bearings formed by the groove 65 and when the screws 71 are tightened.

Figs. 12, 13, 14 and 15 illustrate a further modification of the invention in which the solenoid is provided with a complete magnetic circuit. Referring to Fig. 13 of the drawings, the solenoid comprises upper and lower spools 83 of molded insulating material held together by an insulating tube 85. An energizing coil 87 is mounted in the spool 83—85. Each of the spools 83 have end frames 89 molded integral therewith and a bar 91 of magnetic material molded therein. Plates 93 of magnetic material are mounted by means of screws 95 on opposite ends of the bars 91. Molded in end frames 87 adjacent the ends thereof are grooves 97 in which are disposed bearing plates 99 having slots 101 therein for receiving the reduced ends 103 of a spring guide 105. The spring guide 105 is formed from a thin flat piece of spring material and has longitudinally extending slots 107 there forming fingers 109 extending inwardly from the ends of the spring guide. The fingers 109 terminate adjacent each other and have facing semicircular notches 111 therein for receiving a bearing 113 for connecting the upper and lower spring guides 105 to an armature 115. The upper bearing 113 is spaced from the upper end of the armature 115 by a spacer 117 and is secured to the armature by means of a long screw 119 which extends through the spacer 117 and threadedly engages in a tapped opening in the armature. The lower bearing 113 is secured directly to the lower end of the armature by a screw 121.

Mounted on the end frames 89 of the spools 83 are rectangular diaphragms 123 which are held in place by means of rectangular retainers 125 secured to the end frames 89 by screws 127. The diaphragms 123 are compressed between the end frames 89 and the retainers 125 to form a dust-tight seal. At their centers the diaphragms 123 are provided with openings through which the screws 119 and 121 extend. Tightening the screws 119 and 121 compresses the diaphragms 125 between the rounded inner ends of the screws and the bearing members 113 to complete the dust-tight seal.

The magnetic circuit of the solenoid includes the bars 91 and the plates 93. The magnetic circuit also includes a fixed core member 129 secured to the upper bar 91 and extending inwardly therefrom toward the upper end of the armature 115. The inner end of the fixed core member 129 is provided with a conical recess 131 for cooperating with the upper end 133 of the armature 115 which is in the shape of a truncated cone. A tubular member 135 of magnetic material is secured to the lower bar 91 and extends inwardly therefrom surrounding the armature 115.

The operation of the solenoid shown in Fig. 13 is similar to the previously described modification. The armature 115 is normally biased by its own weight to the lower position in which it is shown. Energization of the coil 87 attracts the armature 115 upwardly, flexing the diaphragms and the fingers 109 of the spring guide 105, the armature being guided by engagement of the inner ends of the fingers 109 with the bearing members 113.

When the coil 87 is deenergized, the armature 115 drops by its own weight to the position shown in Fig. 13.

As shown, the opening formed by the semi-circular notches 111 (Fig. 14) in the facing ends of the fingers 109 is of slightly larger diameter than the diameter of the bottom of the groove in the bearing 113 to permit free movement of the armature. By making the distance between the notches 111 smaller, the device will operate with a snap action which would prevent movement of the armature until the magnetic field has built up sufficiently to move the armature all of the way.

It will be seen that the invention provides a dustproof solenoid in which the moving armature is guided in its operation by means of dust caps or diaphragms at the ends of the solenoid or by means of spring guides attached to opposite ends of the armature. The parts are assembled concentric with the axis of the coil spool and the armature is prevented from being pulled against the stationary parts which reduces friction to a minimum.

Having described several embodiments of the invention in accordance with the provisions of the patent statutes, it is to be understood that various changes and modifications may be made therein without departing from the spirit of the invention.

I claim as my invention:

1. An electromagnetic device comprising an energizing winding, an insulating tubular member supporting said winding, a magnetic member movable in said tubular member, an annular flange at each end of said tubular member, each of said flanges having an internal annular groove therein, a flexible disc mounted in each of said grooves for sealing the ends of said tubular members, said discs being fastened to the ends of said armature and supporting and guiding said armature for axial movement in said tubular member.

2. An electromagnetic device comprising a tubular support member having flanged end portions, with each of said flanged end portions having an internal annular groove therein, an energizing coil mounted on said tubular support member between said flanged end portions, an armature disposed for axial movement within said tubular member, resilient means secured to the ends of said armature for supporting and guiding said armature for axial movement while preventing lateral movement of said armature relative to said tubular support member, with said resilient means including a pair of resilient sealing members respectively mounted in each of said annular grooves for sealing the ends of said tubular member and providing a bearing for said axial movement of the armature relative to said tubular support member.

3. An electromagnetic device comprising an energizing winding, a tubular support of insulating material supporting said winding, an armature movable in said tubular support, resilient means of molded insulating material mounted on the ends of said tubular member sealing said tubular member, and spring means including at least a pair of finger members extending inwardly from said tubular member to said armature for providing a knife-edge bearing to support and guide said armature for axial movement relative to said tubular member.

4. An electromagnetic device, an insulating tubular support member having flanged end portions, an energizing winding supported on said tubular member between said flanged end portions, an armature disposed for movement in said tubular support member, spring means including a pair of finger members mounted in each of said flanged end portions and being connected to opposite ends of said armature for providing a snap-acting support for the axial movement of said armature, such that the magnetic field of said winding is not operative to axially move said armature until said field is built up enough to move said armature to the end of its axial travel due to said magnetic field.

References Cited in the file of this patent

UNITED STATES PATENTS

| | | |
|---|---|---|
| 2,427,630 | Snyder | Sept. 16, 1947 |
| 2,435,817 | Boynton et al. | Feb. 10, 1948 |
| 2,659,074 | Alexander | Nov. 10, 1953 |